(12) United States Patent
Henry et al.

(10) Patent No.: US 11,774,351 B2
(45) Date of Patent: Oct. 3, 2023

(54) METHOD AND APPARATUS FOR MEASURING ENGINE OIL CONSUMPTION USING LASER INDUCED BREAKDOWN SPECTROSCOPY

(71) Applicant: Southwest Research Institute, San Antonio, TX (US)

(72) Inventors: Cary Henry, Helotes, TX (US); Nolan Wright, San Antonio, TX (US); Thomas Moore, San Antonio, TX (US)

(73) Assignee: SOUTHWEST RESEARCH INSTITUTE, San Antonio, TX (US)

( * ) Notice: Subject to any disclaimer, the term of this patent is extended or adjusted under 35 U.S.C. 154(b) by 0 days.

(21) Appl. No.: 17/444,588

(22) Filed: Aug. 6, 2021

(65) Prior Publication Data
US 2023/0040200 A1    Feb. 9, 2023

(51) Int. Cl.
*G01N 21/33* (2006.01)
*G01M 15/10* (2006.01)

(52) U.S. Cl.
CPC .......... *G01N 21/33* (2013.01); *G01M 15/108* (2013.01); *G01N 2201/06113* (2013.01)

(58) Field of Classification Search
CPC ......... G01N 21/33; G01N 2201/06113; G01M 15/108
See application file for complete search history.

(56) References Cited

U.S. PATENT DOCUMENTS

| 4,990,780 A * | 2/1991 | Lee | G01N 21/39 250/343 |
| 6,294,389 B1 * | 9/2001 | Vitale, Jr. | G01M 15/108 73/23.31 |
| 7,480,044 B2 | 1/2009 | Leipertz | |
| 2021/0172800 A1 * | 6/2021 | Al-Haimi | G01J 3/443 |

OTHER PUBLICATIONS

Elnasharty et al., Diagnosis of lubricating oil by evaluating cyanide and carbon molecular emission lines in laser induced breakdown spectra, Spectrochimica Acta Part B, vol. 66, pp. 588-593. (Year: 2011).*
Zheng et al., On the performance of laser-induced breakdown spectroscopy for direct determination of trace metals in lubricating oils Spectrochimica Acta Part B, vol. 99, pp. 1-8. (Year: 2014).*
Arca et al, "Detection of environmental contaminants by time resolved laser induced breakdown spectroscopy technique", 1996 International Geoscience and Remote Sensing Symposium, vol. 2, pp. 854-856. (Year: 1996).*

* cited by examiner

*Primary Examiner* — Kiho Kim
(74) *Attorney, Agent, or Firm* — Grossman, Tucker, Perreault & Pfleger, PLLC

(57) ABSTRACT

A method, apparatus and/or system for measuring engine oil consumption using laser induced breakdown spectroscopy.

12 Claims, 4 Drawing Sheets

METHOD AND APPARATUS FOR MEASURING ENGINE OIL CONSUMPTION USING LASER INDUCED BREAKDOWN SPECTROSCOPY

FIELD

The present invention provides a method, apparatus and/or system for measuring engine oil consumption using laser induced breakdown spectroscopy.

BACKGROUND

Consumption of engine lube oil during internal combustion (IC) engine operation has long been a known issue for engine developers. A major negative impact of oil consumption is on the tailpipe emissions. Engines are optimized for fuel combustion, and lube oil undergoes incomplete combustion to form longer chain hydrocarbons and/or oxidized organic compounds in much larger quantities than those produced by fuel combustion. In addition, oil contains metal additives and other inorganic elements in much higher concentrations than fuel. These elements can produce greater particulate emissions and interact with aftertreatment materials to poison them and reduce catalyst performance over time. Whether from bulk oil consumption in the cylinder, leaking past shaft seals in a turbocharger, or through some other consumption mechanism, oil consumption can have a negative impact both on tailpipe emissions and on aftertreatment performance. Both impacts are only increasing as points of concern during engine development as overall emissions decrease. Lower total emissions increase the relative impact of oil's contribution, and the lower emissions are being driven by increasingly complex aftertreatment systems which makes potentially reactive species more of a concern.

Oil consumption over a relatively long period of testing can be measured gravimetrically or by volume, but for more precise analysis there is a need to measure consumption during particular operating conditions, and a real-time solution is desired. Current technologies for measuring oil consumption in real-time exist but have several challenges. One of the most popular real time solutions is to detect sulfur in the exhaust through ultraviolet (UV) excitation and fluorescence detection. A major challenge with this method is avoiding interference effects from other components of the exhaust. The system includes a relatively high temperature furnace, water vapor removal, and an ozone generator to oxidize NO which interferes with sulfur collection. The complexity of this sampling system means that it has higher relative cost, has a number of different potential failure points, must use passivated lines for sample transport, and requires an expert operator. In addition to potential interferences from non-sulfur species, the instrument is also susceptible to interferences from sulfur from other sources besides oil. Ultralow sulfur fuels and new engines must be used to avoid contamination from those two sources, but even with that stipulation, the sulfur level in the fuel must typically be measured hourly so that it can be accounted for. Another common method for real-time oil consumption measurement uses a radioactive tracer element that is doped into the fuel before testing. The selectivity of this method means that it has fewer potential sources of interference and requires less pretreatment of exhaust. However, the regulatory, logistical, and safety challenges of obtaining and working with the isotopes required makes this method unattractive to many companies (especially in the United States).

SUMMARY

A method of measuring the rate of engine oil consumption in engine exhaust comprising irradiating engine exhaust and detecting the emission signal intensity versus wavelength in said engine exhaust by laser-induced breakdown spectroscopy (LIBS) and identifying in the emission signal intensity versus wavelength one or more emission signals having an intensity that is characteristic of an elemental ion in the engine exhaust. This then can be followed by correlating the intensity of the emission signal of the elemental ion in the engine exhaust with a rate of engine oil consumption.

A method of measuring the rate of engine oil consumption in engine exhaust comprising irradiating engine exhaust and detecting the emission signal intensity versus wavelength in the engine exhaust by laser-inducted breakdown spectroscopy (LIBS) and identifying in the emission signal intensity versus wavelength one or more emission signals having an intensity that is characteristic of a calcium ion in said engine exhaust. This then can be followed by correlating the intensity of the emission signal of the calcium ion in the engine exhaust with a rate of engine oil consumption.

A system for measuring the rate of engine oil consumption in engine exhaust comprising a test area in the exhaust including optical access to said test area and a laser light source configured to emit an optical beam with a power density of greater than or equal to 1 $GW/cm^2$ towards the optical access of the test area of the exhaust that generates an ionized plasma within the exhaust. The system also includes a spectral detection device configured to receive an optical beam from the optical access to said exhaust and an electronic processing device communicating with the spectral detection device wherein the electronic processing is configured to measure the rate of engine oil consumption in the engine exhaust.

DETAILED DESCRIPTION

The present invention is directed at measuring engine oil consumption using laser induced breakdown spectroscopy (LIBS). Engines herein include, e.g., any engine wherein oil consumption may occur during combustion and become part of the emissions, including internal combustion engines such as gasoline engines, diesel engines, or gas-turbine engines.

Reference to LIBS is reference to the use of a relatively high energetic laser pulse as the excitation source. Such LIBS may preferably rely upon a Nd:YAG solid-state laser with a wavelength of 1064 nm with a power density of greater than or equal to 1 $GW/cm^2$. Pulse width may preferably be in the range of 6 ns to 15 ns. LIBS. The LIBS system herein therefore includes the relatively high energy laser, focusing optics and a spectral detection system. Laser pulse frequency was 10 Hz and laser pulse frequencies of up to 400 Hz are contemplated.

The LIBS method therefore can generate an ionized plasma that originates from the relatively large electric field generated by the relatively high energy laser pulse on, or within, the sample. The sample is ablated or breaks down as the plasma plume is formed with plume temperatures at or above 10,000° K. This relatively high temperature results in excitation of the atomic elements, including atomic ions, and as the plasma cools, these elements emit light that can be used to qualitatively or quantitatively identify the atomic elements and ions present in the sample.

Figure 1:
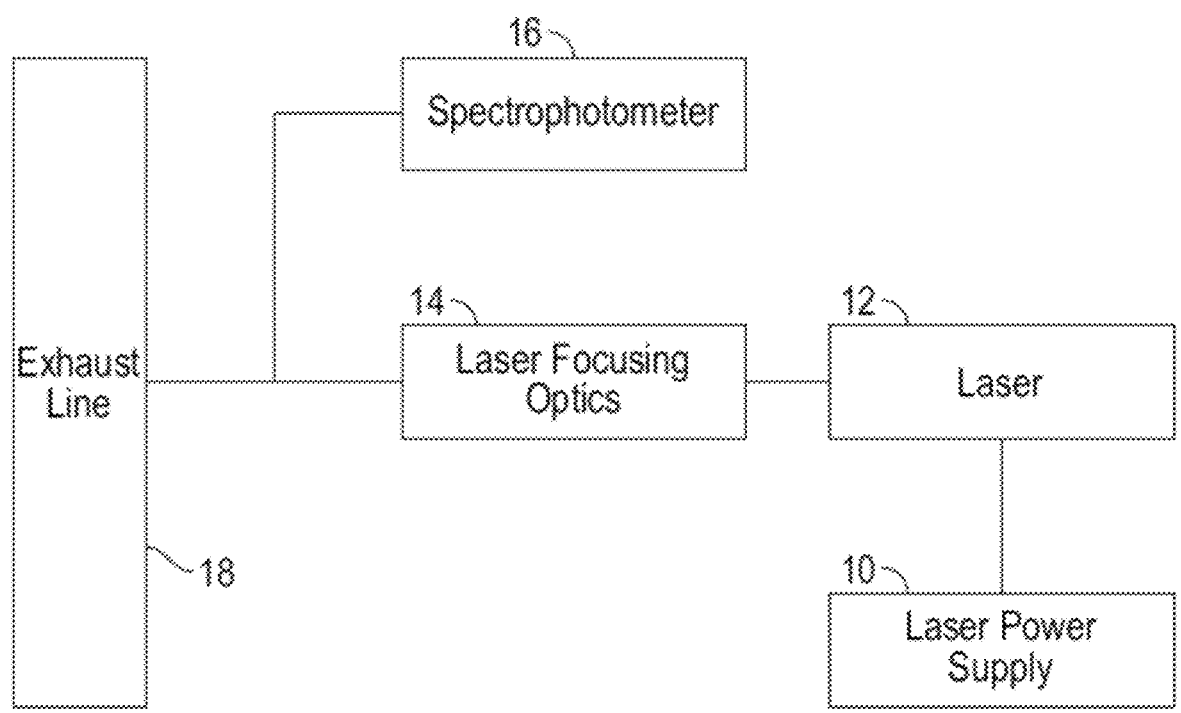
FIG. 1 illustrates a preferred LIBS configuration for measurement of engine oil consumption.

A preferred LIBS set-up herein for real time measurement of engine oil consumption using LIBS is illustrated in FIG. 1. Reference to real time measurement of engine oil consumption may be understood as preferably providing engine oil consumption measurement outputs in the range of 20 seconds to 1000 seconds, more preferably 20 seconds to 500 seconds, or 20 seconds to 200 seconds, or 20 seconds to 100 seconds. Laser pulse frequencies of 400 Hz are contemplated to provide the more preferred and relatively shorter real time measurement values noted herein.

As can be seen, it preferably includes a laser power supply 10, a Nd:YAG solid-state laser 12 with a wavelength of 1064 nm with a power density of greater than or equal to 1 $GW/cm^2$, laser focusing optics 14, a spectral detection device such as a spectrophotometer 16 and an electronic processing device 17 (computer). The laser focusing optics 14 therefore preferably provide the laser with a wavelength of 1064 nm with a power density of greater than or equal to 1 $GW/cm^2$ to a test area within the exhaust line/passageway 18 which then results in an emission signal that is identified by the spectrophotometer that is characteristic of the elements in the oil associated with oil consumption.

Figure 2A:
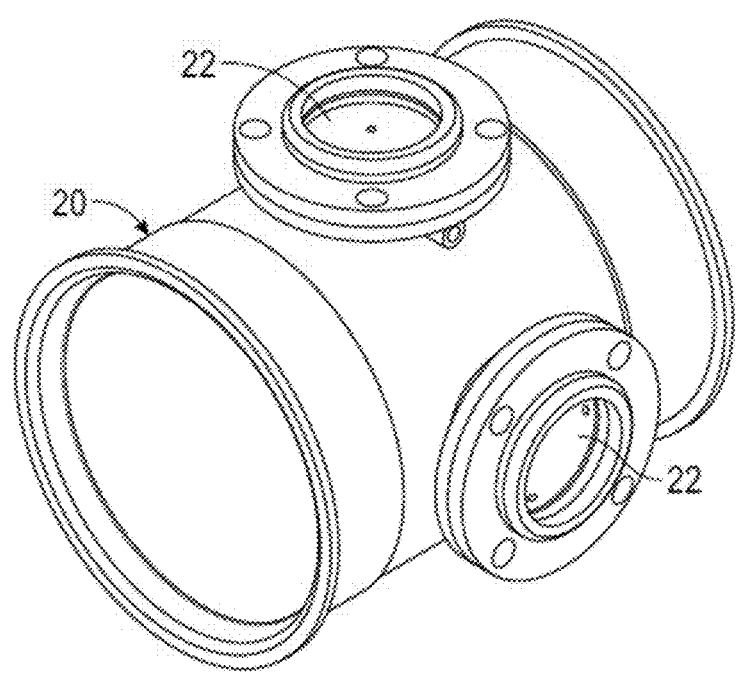
FIG. 2A illustrates a preferred piping fixture to provide for LIBS of a vehicle exhaust line.
Figure 2B:
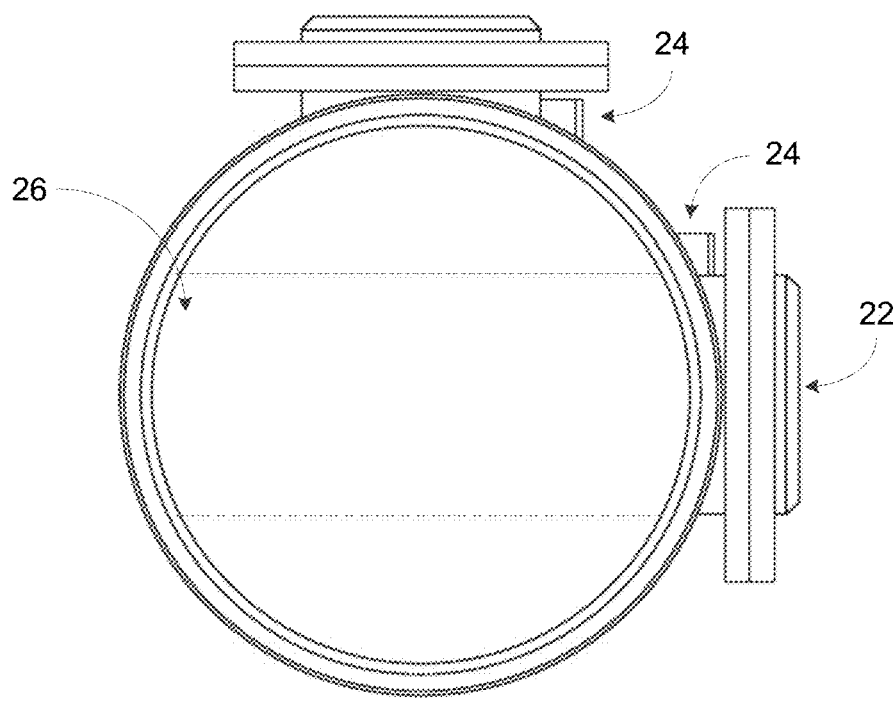
FIG. 2B provides a cross-sectional view of the piping fixture of FIG. 2A.

The integration of the LIBS equipment with the exhaust line is preferably achieved by the piping fixture 20 illustrated in FIG. 2A. As can be seen, the piping fixture preferably includes two nitrogen purged quartz windows 22 to allow laser and fiber optic access to a corresponding test area of the flowing exhaust when such piping fixture in installed in the exhaust line/passageway 18. As may therefore be appreciated, the test area 26 of the exhaust is that portion of the exhaust that is flowing by one of the quartz windows 22 and upon which the laser energy will interact. See FIG. 2B. The two quartz windows as shown, preferably at a 90 degree angle relative to one another, allow the laser to be introduced through one of the quartz windows, which quartz window preferably has a diameter of 2.75 inches. Detection then can take place at either the same window or perpendicular to the window receiving the laser energy. Both windows also preferably incorporate an adjustable nitrogen purge to create a backpressure in front of the window to reduce and eliminate soot that may accumulate during testing. Nitrogen inlets for producing the above referenced purged can be seen at 24 in FIG. 2B. The pipe fixture 20 is preferably itself 3.0 inches to 5.0 inches in diameter which therefore allows for such pipe fixture to integrate relatively easily with typical exhaust systems.

As alluded to above, fiber optic capable is preferably employed to deliver emissions from the quartz window to the spectrophotometer and charge couple camera device outside the cell. This set-up allows such sensitive equipment to be removed from the relatively hazardous conditions that may be present in the test cell and allows for remote operation of the detection parameters.

The use of the above to account for engine oil consumption starts with the observation that oils utilized in engines typically contain additives with metallic or phosphorous components. Such metallic components may include one or more of, e.g., calcium (Ca), magnesium (Mg), zinc (Zn) or molybdenum (Mo). These metallic components when ionized by LIBS (i.e. removal of one or more electrons of the metal) were then identified herein as a proxy for a measurement of engine oil consumption. In addition, as noted, phosphorous (P) may be relied upon in a similar manner.

Accordingly, elemental ions are derived herein from the elements present in the oil, which preferably include Ca, Mg, Zn, Mo or P. Accordingly, utilizing LIBS, one or more of such elements may be ionized and detected in the exhaust flow of the engine and the detected concentrations of the one or plurality of such elemental ions in the free-flowing exhaust can now be correlated to oil consumption.

Figure 3:
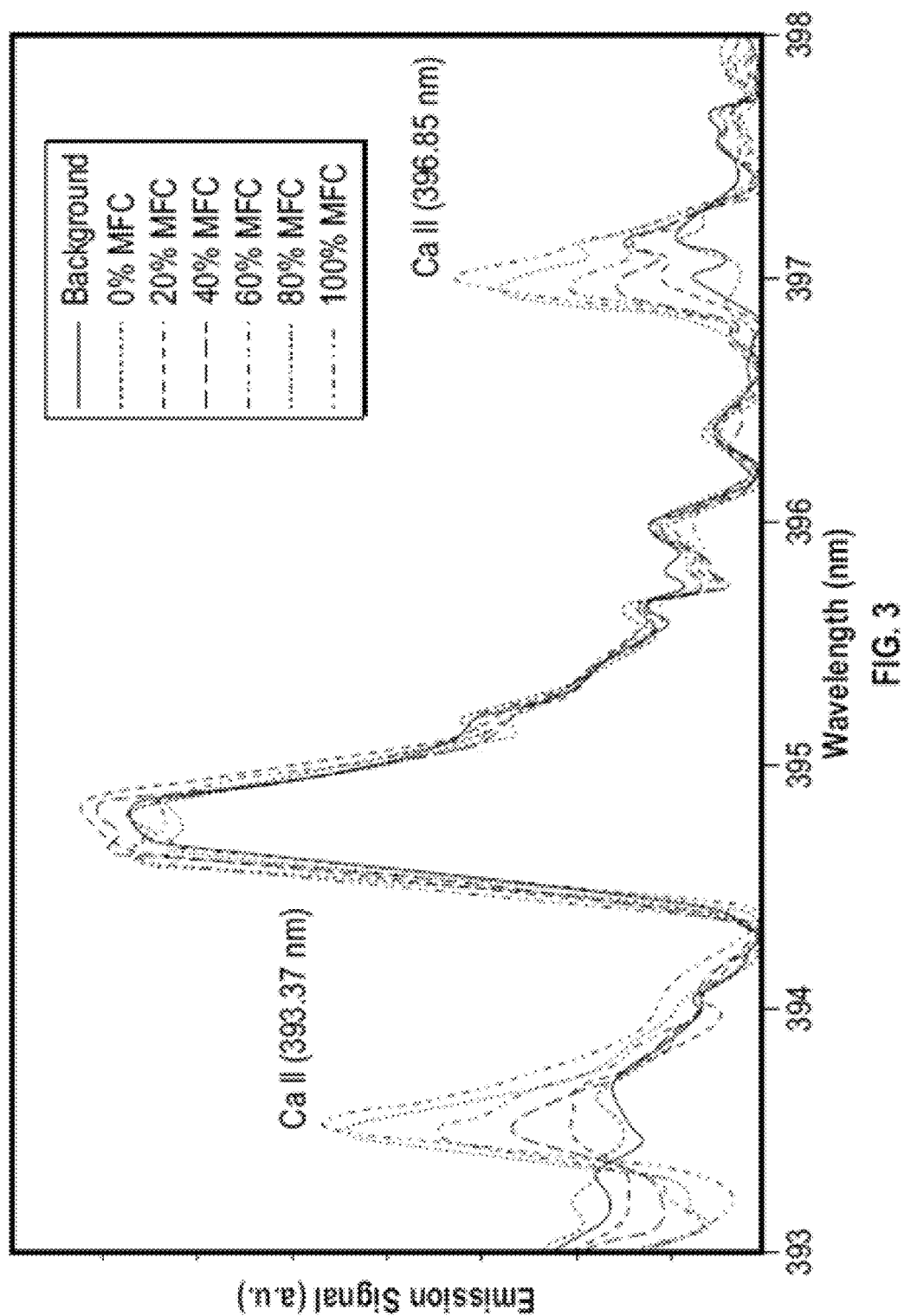
FIG. 3 provides the LIBS of a burner system used to replicate engine exhaust showing the peak intensity for a mass flow controller set at 0% to 100%, which mass flow controller introduced oil into the burner fuel line at a rate of 0 gm/hour to 30 gm/hour.
Figure 4A:
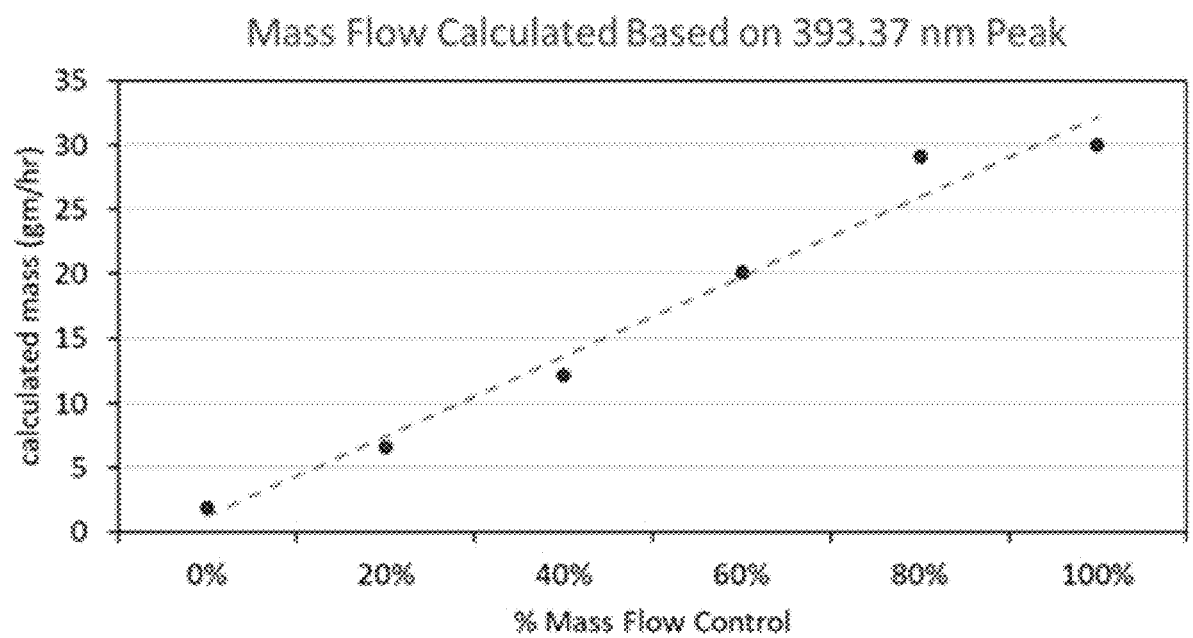
FIG. 4A provides a plot of the calculated mass (gm/hr) versus % mass flow control for the 393.37 nm peak in FIG. 3.
Figure 4B:
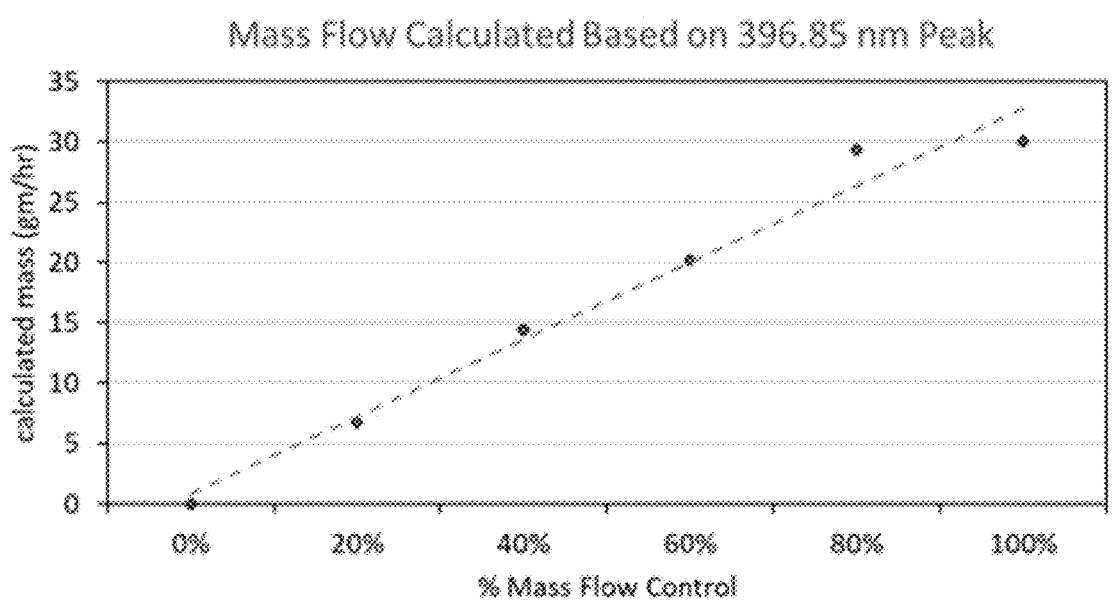
FIG. 4B provides a plot of the calculated mass (gm/hr) versus % mass flow control for the 396.85 nm peak in FIG. 3.

More specifically, the exhaust flow is now capable of LIBS analysis herein and preferably with no sample collection, isolation or treatment required. Oil flows ranging from 20% to 100% of a mass flow controller's (MFC's) maximum rate (6 g/hr to 30 g/hr) were non-sequentially introduced into the fuel line of a burner system to replicate engine exhaust, and 10,000 shots of LIBS data were collected at each point. A 10 Hz laser was employed. Attention is directed to FIG. 3 which shows that for a calcium ion, e.g., calcium II ($Ca^{2+}$), the peaks analyzed by LIBS increase at the expected wavelengths of 393 nm to 394 nm (preferably 393.37) nm and 396 nm to 397 nm (preferably 396.85 nm) as the oil flow increased through the mass flow controller (MFC) setting (i.e. MFC at 0% to 100%). FIG. 4A provides a plot of the calculated mass (gm/hr) versus % mass flow control for the 393.37 nm peak in FIG. 3. FIG. 4B provides a plot of the calculated mass (gm/hr) versus % mass flow control for the 396.85 nm peak in FIG. 3 Accordingly, for a given engine utilizing oil that contains Ca, one can utilize LIBS and generate a plot of emission signal intensity versus wavelength from analysis of the exhaust flow and specifically analyze the peaks outputs at 393.37 nm and 396.85 nm. Using the information provided in FIGS. 3 and 4A and 4B, one can then determine the mass flow rate of oil consumption in gm/hour.

As therefore can now be appreciated, the present invention provides an apparatus, system and/or method for measuring engine oil consumption using LIBS. More specifically, LIBS analysis of the metallic elements (calcium, magnesium, zinc, molybdenum) or phosphorous typically employed in engine oil, and therefore present in the engine exhaust when engine oil is combusted, can now be correlated with the rate of engine oil consumption. Such rate of engine oil consumption that can now be detected herein preferably falls in the range of 0.1 g/hr to 30 g/hr. The detection of oil consumption herein may therefore be used to diagnose mechanical or operational problems in the engine, including, e.g., oil finding its way past seals and burning in the cylinders during combustion and/or higher than normal engine temperatures. In addition, the detection of such oil consumption herein is contemplated to advantageously provide a more immediate and relatively early indication of oil consumption, so that exhaust after-treatment systems, which would other wise become contaminated due to the combustion of engine oil, may be avoided.

Oil consumption rates for engines will of course vary with engine type. A typical passenger vehicle should consume less than a quart of oil between scheduled oil changes (e.g., every 7500 miles). This would correspond to an oil consumption rate of about 15 g/hour. Relatively larger engines will consume relatively more fuel and relatively more oil, so the ratio of oil product to overall emissions is contemplated to remain relatively constant between engine families, and the oil monitoring apparatus and method of the present invention is therefore contemplated to remain applicable to engines of varying size.

What is claimed is:

1. A method of measuring the rate of engine oil consumption in engine exhaust comprising:
   irradiating engine exhaust and detecting the emission signal intensity versus wavelength in said engine exhaust by laser-induced breakdown spectroscopy (LIBS);
   identifying in said emission signal intensity versus wavelength one or more emission signals having an intensity that is characteristic of an elemental ion in said engine exhaust wherein said elemental ion in said engine exhaust is derived from one or more of calcium, magnesium, zinc, molybdenum or phosphorous;
   correlating the intensity of the emission signal of said elemental ion in said engine exhaust with a rate of engine oil consumption;
   wherein said rate of engine oil consumption is in the range of 0 gm/hour to 30 gm/hour and wherein said method of measuring the rate of oil consumption in engine exhaust is achieved over a time period of 20 seconds to 1000 seconds.

2. The method of claim 1 wherein said elemental ion comprises a calcium ion and said one or more emission signal wavelengths comprise a first wavelength at 393 nm to 394 nm and a second wavelength at and 396 nm to 397 nm.

3. The method of claim 1 wherein said method of measuring the rate of oil consumption in engine exhaust is achieved over a time period of 20 seconds to 500 seconds.

4. The method of claim 1 wherein said method of measuring the rate of oil consumption in engine exhaust is achieved over a time period of 20 seconds to 200 seconds.

5. The method of claim 1 wherein said LIBS provides a power density of greater than or equal to 1 $GW/cm^2$.

6. A method of measuring the rate of engine oil consumption in engine exhaust comprising:
   irradiating engine exhaust and detecting the emission signal intensity versus wavelength in said engine exhaust by laser-inducted breakdown spectroscopy (LIBS);
   identifying in said emission signal intensity versus wavelength one or more emission signals having an intensity that is characteristic of a calcium ion in said engine exhaust;
   correlating the intensity of the emission signal of said calcium ion in said engine exhaust with a rate of engine oil consumption;
   wherein said rate of engine oil consumption is in the range of 0 gm/hour to 30 gm/hour and wherein said method of measuring the rate of oil consumption in engine exhaust is achieved over a time period of 20 seconds to 1000 seconds.

7. The method of claim 6 wherein said method of measuring the rate of oil consumption in engine exhaust is achieved over a time period of 20 seconds to 500 seconds.

8. The method of claim 6 wherein said method of measuring the rate of oil consumption in engine exhaust is achieved over a time period of 20 seconds to 200 seconds.

9. The method of claim 6 wherein said LIBS provides a power density of greater than or equal to 1 $GW/cm^2$.

10. A system for measuring the rate of engine oil consumption in engine exhaust comprising:
    a test area in said exhaust including optical access to said test area;
    a laser light source configured to emit an optical beam with a power density of greater than or equal to 1 $GW/cm^2$ towards the optical access of said test area of said exhaust that generates an ionized plasma within said exhaust;
    a spectral detection device configured to receive an optical beam from said optical access to said exhaust is configured to detect the presence of ions of one or more of calcium, magnesium, zinc, molybdenum or phosphorous;
    an electronic processing device communicating with the spectral detection device wherein the electronic processing is configured to measure the rate of engine oil consumption in said engine exhaust;
    wherein the electronic processing is configured to measure a rate of oil consumption in the range of 0 gm/hour to 30 gm/hour and wherein the system is configured to measures the rate of oil consumption in engine exhaust over a time period of 20 second to 1000 seconds.

11. The system of claim 10 wherein said spectral detection device configured to receive an optical beam from said optical access to said exhaust is configured to detect the presence of a first wavelength at 393 nm to 394 nm and a second wavelength at 396 nm to 397 nm.

12. The system of claim 10 wherein the system is configured to measure the rate of oil consumption in engine exhaust over a time period of 20 seconds to 500 seconds.

* * * * *